United States Patent Office 3,650,977

Patented Mar. 21, 1972

3,650,977

METHOD OF PREPARING SILICA SOL AND PRODUCT THEREOF

John S. Stephen Bobb, Springfield, Pa., assignor to Philadelphia Quartz Company, Philadelphia, Pa.

No Drawing. Continuation-in-part of application Ser. No. 548,841, May 10, 1966. This application Mar. 27, 1969, Ser. No. 811,219

Int. Cl. B01j 13/00; C01b 33/14, 33/18

U.S. Cl. 252—313 S 16 Claims

ABSTRACT OF THE DISCLOSURE

A method of forming a silica sol, including adding silicon metal to an aqueous solution containing an inorganic alkali metal compound and having a pH in excess of about 11, such as sodium hydroxide, potassium hydroxide, lithium hydroxide, sodium silicate, sodium metasilicate, etc., while maintaining the temperature between about 50 and 100° C. and thereafter maintaining these materials in contact at the above temperatures for a period sufficient to produce a predetermined silica-to-alkali metal oxide ratio or a predetermined pH is attained. If the temperature reaches 100° during either of the treating steps, the product produced loses some of its hydrophilic character to the point of becoming a hydrophobic, low viscosity silica sol, whereas at lower temperatures, hydrophilic, high viscosity silica sols are produced. In addition, by maintaining the temperature in the critical range of 90 to 95° C., substantial increases in the efficiency of conversion of silicon to silica are obtained. The silica sol products of the invention are characterized by a viscosity below about 200 cp. for hydrophobic sols and a viscosity substantially above 300 cp. for hydrophilic sols at silica contents of about 50% and both are characterized by formation of a coacervate or precipitate which does not harden or redissolve when conventional gelling agents are added thereto.

CROSS-REFERENCE TO RELATED APPLICATION

The present application is a continuation-in-part of application Ser. No. 548,841, filed on May 10, 1966, by the present inventor and entitled "Hydrophilic Silica Sol," now abandoned.

BACKGROUND OF THE INVENTION

Aqueous silica sols are produced commercially in a number of ways and are known to be hydrophobic, low viscosity sols. Usually such sols are prepared by removing all but a small portion of the alkali metal present in sodium silicate to produce a colloidal system of a polymeric silicic acid. The removal of the alkali metal may be accomplished in a variety of ways, including neutralization by a mineral acid followed by removal of the salt formed, dialysis or electrodialysis and electro-osmosis. However, the most prevalent method is that originally taught in Bird Pat. 2,244,325. In accordance with the Bird process, an alkali metal silicate is passed through an iron exchange material which removes most of the sodium ions, thereby forming silicic acid. However, unless it is stabilized by the addition of an alkali, the acidic sol will gel in a very short period of time, usually in hours. In any event, one substantial disadvantage of silica sols prepared in these manners is that the sols are relatively dilute and contain very small amounts of silica. The Bird patent suggests that concentrations as high as 15% silica can be obtained by evaporation. In a still further improvement, U.S. Pat. 2,574,902 to Bechtold et al. suggests forming a "heel" by heating alkali stabilized sols of the Bird type to temperatures above about 60° C. The heel, thus formed, comprises large particles or nuclei of polymerized silicic acid. Thereafter, when additional quantities of dilute sol are slowly brought into contact with the heel, the added silica polymerizes on the nuclei thereby forming larger particles. This latter process is utilized in most commercial operations to produce silica sols of high silica content.

Compared to the above-mentioned technique, it has also been proposed that silica sols may be produced from silicon metal rather than sodium silicate. In 1952, Balthis disclosed the use of ammonia and amines as promoters for the reaction of silicon metal with water to form a silica sol. Amines having a pH between about 6 and 12 were preferred and it was stated that if a pH of about 14 was utilized, the silica particles formed were below about 8 $m\mu$ in size. Additions of 23% ammonium solution would be more alkaline than pH 12. Temperatures below 100° C. were preferred but an autoclave could be used and silicon having a particle size of 80–325 mesh preferably activated by cleaning with fluoride was recommended. Stable sols of 25–35% silica could be formed and these could be further concentrated to 50% silica without immediate gelation. The silica was porous, hydrophobic, easily depolymerized and ranged from 8 to 35 $m\mu$ in particle diameter. The nitrogen base was removed by distillation. In Pat. 2,614,993, Montenyohl et al. disclose carrying out the reaction with ammonia or amines in a vented ball mill so that the grinding of the mill would continuously clean the surface of the silicon metal for further reaction. Montenyohl also pointed out that if ammonia were utilized in his operation, a hydrophobic sol would be produced, whereas a hydrophilic sol would be produced if an amine were present. In Montenyohl, the temperature was maintained below about 90° C. and, preferably, ambient temperature was utilized. Montenyohl cautioned that at a pH above 12, silicates rather than silica sol would be formed. He further cautioned that the greater the heat utilized in the reaction, the less ammonia remains dissolved and therefore the efficiency of the reaction would apparently be reduced. Finally, at least as early as 1916, Baillo, in Pat. 1,178,205, described the production of sodium silicate by the reaction of a 10% solution of sodium hydroxide with lumps of silicon at ordinary temperatures. The process was carried out in a closed vessel for the production of hydrogen gas, the sodium silicate thereby being an undesired side product.

Those investigators who have utilized the reaction of silicon metal with alkali metal hydroxide solutions have been under the impression that alkali is used up in the reaction and therefore additional alkali is needed to continue the reaction. Accordingly, it would be impossible to obtain sols with high ratios of silica to alkali metal oxide ($M_2O$) and only soluble silicates of 1 to 2 ratios of silica to alkali metal oxide would be obtained.

In any event, these techniques for utilizing silicon metal as a source of silica sols have remained a laboratory curiosity.

BRIEF DESCRIPTION OF THE INVENTION

In accordance with the present invention, silica sols are prepared by reacting silicon metal with water in the presence of an inorganic alkali metal compound, in an amount sufficient to produce an aqueous solution of said water and alkali metal compound having a high pH, and at an elevated temperature. By selecting certain critical temperatures, silica sol products of either hydrophobic or hydrophilic nature are produced which are characterized by a high degree of hydration and the formation of a coacervate or precipitate which does not harden or redissolve upon the treatment of the sol with conventional silica sol gelling agents.

DETAILED DESCRIPTION OF THE INVENTION

Contrary to the teachings of the prior art discussed above, it has been found in accordance with the present invention that alkali metal compounds act as catalysts in promoting the reaction of silicon metal with water to form silica sols. It was further found that the prior art belief that alkalis were used up or consumed in the reaction and that additional alkali was needed to maintain the reaction has no factual basis and accordingly, the silica sols may be formed by adding silicon metal and water to a predetermined amount of alkali metal compound and, since no additional alkali metal compound is needed, the alkali metal compound level diminishes and the pH continuously drops as the reaction proceeds. When operating in accordance with the prior art technique of continuously adding or maintaining the initial volume of alkali, it was impossible to produce silica sols with ratios of silica-to-alkali metal oxide sufficiently high to produce silicates in which such ratio is greater than about 1 to 3. On the other hand, by my process, soluble silicates with ratios of 5 to 25 $SiO_2/Na_2O$ may be formed. In general, I consider ratios above about 25 are likely to act as sols.

In the preparation of the sols in accordance with the present invention, it is preferred that a minimum amount of alkali metal compound be employed so that optimum high ratios of silica-to-alkali metal oxide are obtained in the final sol. It has been found that in order to obtain vigorous, continuous reaction, the initial alkali metal compound should be present in an amount such that it forms an aqueous solution having a pH above about 11. While amounts of alkali metal compound which produce these pH's in the initial volume of water are effective within the temperature range contemplated herein, it is believed that a minimum pH of about 12 is necessary for a commercially feasible operation since the length of time consumed in carrying out the reaction will depend upon the alkali metal ion concentration.

In carrying out this invention, I prefer to use about 2% NaOH or its chemical equivalent of other alkali metal compounds, i.e. about 1.3% $Na_2O$, as the alkali. Actually, I may use as low as about 1% of NaOH with a pH above about 13, but other alkalies, such as with 1% $Na_2O$, may have a pH as low as about 11. On the other hand, I may use as much as about 4% NaOH or its chemical equivalent of other alkali metal compounds although this reduces the final ratio which may be obtained and increases the amount of silicate formed in the initial stages.

Suitable alkali metal compounds for use in accordance with the present invention include sodium hydroxide, potassium hydroxide, lithium hydroxide, soluble alkali metal silicates, such as sodium silicate having a 3.22 ratio of silica to sodium oxide and sodium metasilicate, cesium hydroxide, rubidium hydroxide, etc. The alkali metal compound is placed in a suitable reaction vessel as an aqueous solution having the above specified pH. The reaction vessel should be equipped with a mechanical stirrer, a gas outlet mounted on a reflux condenser, a thermometer and an access port for introducing reactants. The alkali metal compound solution is heated to the desired temperature of reaction and powdered silicon metal is added to the aqueous solution. The silicon metal may be added in a step-wise fashion or continuously. When stepwise addition of silicon metal is practiced, the first two portions of silicon metal result in a rather vigorous reaction. Following such addition and a period sufficient for the vigorous reaction to subside, additional portions of silicon metal are added, immediately followed by sufficient water to maintain the concentration of silica below about 12%. The intervals between additions will normally be between about 5 and 20 minutes with intervals of about 15 minutes appearing to be most efficient. The additions of silicon and water are continued until the reaction becomes sluggish or until a desired ratio of $SiO_2/M_2O$ or pH is attained. It is also possible to add the silicon metal and water by pumping a slurry of the same continuously to the reactor. In this mode of operation, the rate of addition of silicon metal and water are substantially the same as the rates which are effective when incremental additions of these materials are utilized in a step-wise addition. Following the addition of all of the silicon metal, the reaction mixture is maintained at the desired temperature for at least a sufficient time to increase the conversion of silicon to silica. It has been found in some cases that as much as 8 hours or more is effective for completing the conversion to the desired level.

The temperature employed in accordance with the present invention is critical to the production of specific types of sols. Normally, the temperature must be maintained above ambient temperature in order to attain sufficient reactivity. It has been found that the reaction may be initiated at temperatures as low as 50° C. However, as a practical matter, the temperature should be at least 70 to 80° C., in order to effectively carry out the reaction. At these minimal temperatures, the conversion efficiency is relatively low; for example, at about 80° C. 25% conversion of silicon to silica is attained. On the other hand, if the temperature is too high, the conversion also is adversely affected. Accordingly, a temperature above about 100° C. should not be utilized since, again, a low degree of conversion results, e.g. about 55% or less. However, it has been found, in accordance with the present invention, that if the temperature is maintained between 90 and 95° C. or at least below 98 or 99° C., conversion of silicon to silica will exceed about 90%, being as high as 95% in many cases. In addition to quite radically affecting the efficiency of the reaction, the nature of the product is also dependent upon the temperature. It has been found in accordance with the present invention that highly viscous silica sols of a hydrophilic nature are obtained if the temperature is maintained between about 85 and 95° C. and preferably between about 90 to 95° C. On the other hand, at temperatures from about 95 to 100° C. and preferably between about 98 and 100° C., silica sols are produced which are of normal viscosities and which are hydrophobic in nature. The above specified temperatures apply to both the temperature of reaction during the period when silicon metal is being added as well as the heating period or completion period after termination of silicon metal addition.

Following the final heating step, the silica sol contains up to 12% silica and preferably anywhere from 6 to 10% silica and substantial amounts of unreacted material. This unreacted material includes silicon, gel-like silica, iron and other metals of the $R_2O_3$ group and silicon carbide. These impurities impart a black, very turbid appearance to the sol and should therefore be removed. It has been found in accordance with the present invention that removal of substantially all of the subject impurities can be effected by centrifuging or other appropriate techniques. The preferred method is a combination of centrifuging at about 500 r.p.m. for a period of about 8 hours, followed by filtering on a continuous centrifuge filter through filter aids. After removal of the substantial portion of the impurities, the dilute sol is of normal color.

The dilute sol can be concentrated by any convenient means. However, the method used most frequently is a constant volume distillation at slightly reduced pressure. During concentration of the sol, the sol must be kept in constant vigorous agitation since it dehydrates rapidly on the surface forming an insoluble crust. It has been further found in accordance with the present invention that the dilute sol can be concentrated to a silica content as high as 50% and that such sols are stable at this concentration for extended periods of time. While concentrated sols having a silica content of about 50% are predominantly gray in color, thereby showing the presence of small amounts of residual silicon and impurities, at concentrations less than about 40%, the discoloration is almost insignificant.

Since impurities, such as iron and the like, have a tendency to contaminate the product and are generally difficult to remove, it is preferred that the silicon metal employed be relatively pure. Preferably, a silica content above 90% is desired. However, best results are obtained if the silicon content exceeds about 95%. The silicon utilized should be in powdered or small particle size since this appears to permit effective and more rapid conversion without the utilization of complicated equipment. For example, if clean silicon of a particle size of about 80 to 325 mesh is employed, the reaction may be carried out with conventional mechanical stirring equipment. However, silicon of larger particle size may be employed by carrying out the reaction in a vented ball mill or the like. Obviously, the utilization of such equipment is not favored because of its cost and problems of utilization.

Alkali metal silicates can be prepared using the silicon metal quite simply. A solution of 2% NaOH, for example, is placed in a flask equipped as described herein for the preparation of sols except that the gas outlet is mounted on the flask directly and the reflux condenser is eliminated. The alkaline solution is heated to about 40° C. and the addition of silicon powder is begun. After the initial addition of silicon has been reacting for some time, further additions of both silicon and a solution of 2% NaOH are made at regular intervals. Generally, about 0.1 or 0.2% of silicon powder based on the weight of the total solution is added every 10 minutes but the amount of 2% NaOH solution is varied according to the ratio of silicate to be produced. The temperature is maintained between about 40 and 55° C. throughout the reaction and the reaction is stirred vigorously. The rate of addition of silicon powder is adjusted to maintain a steady evolution of hydrogen gas and prevent the temperature from rising above about 55° C. After the last addition of silicon and NaOH solution is made, the reaction mixture is allowed to sit several hours at room temperature so that the reaction is as complete as possible. The unreacted silicon is then removed by centrifuging and/or filtration and the silicate is concentrated by a convenient method as, for example, at reduced pressure in a rotary evaporator. Naturally other alkali metal compounds, such as sodium silicate, potassium silicate, potassium hydroxide, etc., may be substituted as a source of alkali in this reaction. The ratio of the alkali metal silicate obtained depends on the ratio of the silicon added to the amount of base added. For sodium silicate, this is a straight line relationship. For instance, when about .02 gram of silicon is added per milliliter of 2% NaOH the ratio obtained is 2 $SiO_2/Na_2O$ whereas at about 0.06 gram of Si per milliliter of 2% NaOH the ratio is about 6 $SiO_2/Na_2O$. The properties of the silicates obtained are comparable to commercial silicates. It is noted that the stability decreases strongly with increasing ratios at a given concentration. In the ratio range of 3 to 5, the silicates show very little polymerization of the silica for they are clear water-white solutions while in the range of 6 to 10 $SiO_2/Na_2O$, they show some polymerization, as indicated by faint turbidity and a blue color. The percent conversion of silica to $SiO_2$ in the tests I made ranged from about 60 to 80% and it was found that the highest concentration of silica which was stable in a sodium silicate solution having a ratio of 2.87 $SiO_2/Na_2O$ was about 32% while at 3.8 ratio, it was 23% and at 5.0 ratio, it was 17%, whereas at 8.0 ratio it was 15% and at 10 ratio it was 14%. Obviously at a ratio of about 25, the concentration of silica which is stable will be about 10% since, with the decreasing crystalloidal characteristic of the solution, the solution becomes stable at higher concentrations of silica.

The following specific examples illustrate the practice of the present invention, the significance of the various factors which influence the reaction and the nature of the products produced thereby and such products as compared with products by other techniques.

In the series of tests set forth in Table I below, metallic silicon obtained from Union Carbide Company and Hummel Chemical Company was utilized. This silicon was a powdered form having about a 200 mesh and an approximate silicon content of 96.5%.

The majority of the runs set forth in the table were performed by forming an aqueous solution of 2% sodium hydroxide to form a solution having a pH above about 13 and adding the metallic silicon to this solution in incremental amounts with waiting intervals between about 5 and 20 minutes between each addition sufficient to permit essential completion of the reaction of the increment added. After completion of the addition of the first two portions of silicon, the addition of each subsequent portion of silicon was immediately followed by the addition of sufficient water to maintain a silica concentration below about 12%. Following completion of the addition of silicon metal, heating was continued at the same temperature level or, in some cases, as indicated by the second temperature designation, the temperature was increased slightly for a period of about 8 hours to carry the conversion to essential completion. The dilute sols obtained were then centrifuged at 500 r.p.m. for about 8 hours, followed by filtration on a continuous centrifuge filter through filter aids to remove unreacted silicon and impurities. The dilute sol was then concentrated by constant volume distillation at slightly reduced pressure.

For example, in a run similar to #5, a 2% NaOH solution (600 ml.) was placed in the reaction flask and heated to 80° C. Silicon metal powder was added in four 7 g. portions in a 24 minute period during which the temperature increased to 95° C. After the initial reaction subsided, a water slurry of silicon metal was pumped into the reaction flask with a Sigmamotor pump. The slurry contained 69.6 g. of Si in 1200 g. $H_2O$ and was added at a rate of 12 to 15 ml./min. This rate corresponds to 0.7 to 0.85 g. of Si per minute. After adding 476 g. of silicon metal the reaction mixture was heated for 3 hours. The reaction conditions are summarized below.

Total heating time—11½ hours
Temperature:
Initial—80°–95° C.
Continuous—99–100° C.
2%NaOH solution—600 ml.
Silicon slurry added—6000 ml.
Silicon added—376 g.
Total weight of reaction mixture—6976 g.
pH—10.45

The alkali present in the product was determined by standard volumetric procedures and by flame spectrophotometry. The silica content was determined by boiling a sample with 10 ml. of 2 N sodium hydroxide and titrating the same. A blank is also titrated to provide a correction for the sodium hydroxide that was added. The particle sizes in the sols were calculated from an empirical specific surface area titration as described by Iler in U.S. Pat. 2,727,008. The absolute viscosities were measured with a Brookfield viscometer.

TABLE I

| Sol designation | 1 | 2 | 3 | 4 | 5 | 6 | 7 | 8 | 9 | 10 | 11 | 12 |
|---|---|---|---|---|---|---|---|---|---|---|---|---|
| Reactor temp. (° C.) | 100 | 100 | 100 | 100 | 100 | 80 | 88–95→97–99 | 90–97→100 | 90–97→100 | 90–95 | [1] 90–95 | [2] 90–95 |
| Silicon added (g.) | | 332 | | | 417 | 174 | | | | 205 | 205 | 205 |
| $Na_2O$ (vol.) (percent) | 0.44 | 0.23 | 0.19 | 0.14 | 0.19 | 0.10 | [3] 0.13 | | 0.20 | 0.28 | 0.30 | 0.30 |
| $Na_2O$ (spectro) (percent) | 0.63 | 0.29 | 0.30 | 0.17 | 0.26 | | | | 0.33 | | | |
| $SiO_2$ (vol.) (percent) | 30.0 | 30.0 | 30.0 | 30.0 | 50.0 | 22.0 | 48.45 | 30.0 | 50.42 | 49.69 | 51.03 | 47.35 |
| Wt. ratio: | | | | | | | | | | | | |
| $SiO_2/Na_2O$ (vol.) | 68 | 130 | 157 | 214 | 263 | 22 | [3] 373 | | 252 | 177 | 170 | 158 |
| $SiO_2/Na_2O$ (spectro) | 48 | 103 | 100 | 176 | 192 | | | | 153 | | | |
| Particle size (mμ) | 15.7 | 23.5 | 35.2 | 42.0 | 41.4 | | 37.5 | | 37.8 | 28.4 | 26.1 | 23.7 |
| pH | 10.7 | 10.1 | 10.4 | 10.1 | 9.9 | | 9.4 | 9.5 | 9.4 | 9.7 | 9.7 | 10.1 |
| pH at 10% $SiO_2$ | 10.3 | 9.9 | 10.0 | 9.8 | | | | | 9.8 | 9.8 | | |
| Viscosity: | | | | | | | | | | | | |
| Brookfield (cp.) | 17.0 | 22.0 | 17.0 | 16.5 | 45.0 | | 1,025 | 20 | 147 | 1,340 | 750 | [4] 100 |
| Relative at 10% $SiO_2$ | 1.09 | 1.12 | 1.10 | 1.08 | | | | | 1.20 | 1.23 | 1.23 | |
| Conductivity, mhos/cm | $15.7 \times 10^{-4}$ | $7.26 \times 10^{-4}$ | $7.5 \times 10^{-4}$ | $6.9 \times 10^{-4}$ | | | | | $5.6 \times 10^{-4}$ | | | |
| After ion exchange: | | | | | | | | | | | | |
| Percent $Na_2O$ (spectro) | 0.096 | 0.052 | 0.069 | 0.042 | | | | | 0.055 | | | |
| Percent $Na_2O$ (removed) | 78 | 77 | 64 | 72 | | | | | 44 | | | |
| $SiO_2$ (vol.) (percent) | 22.1 | 22.9 | 16.8 | 26.2 | | | | | 24.9 | | | |
| Ratio | 236 | 440 | 243 | 624 | | | | | 453 | | | |
| pH | 5.0 | 2.8 | 7.2 | 2.80 | | | | | 3.09 | | | |
| Aproximate conversion Si→$SiO_2$ | 55 | 55 | | | 50 | 25 | 60 | | 60–65 | 95 | 85 | 80 |

[1] Silicon acid washed before the reaction.
[2] Reaction done with very pure silicon metal (99.99+% Si).
[3] Alkali reduced with an ion exchange resin.
[4] Viscosity of sample concentrated to 50% $SiO_2$ is 420 cp.

The runs set forth in Table I above show that sols with quite varied ratios and particle sizes can be prepared in accordance with the method of the present invention by reacting silicon metal with water in the presence of an alkali metal compound. Based on these runs together with other runs made, it may be observed that the ratio of silica-to-alkali metal oxide in the sol depends on the amount of silicon metal added and the efficiency of the conversion of silicon to silica. The particle size also is related to the amount of silicon added, the efficiency of the reaction, the pH, and the concentration of silica.

The following table summarily sets forth the relationship of the amount of silicon added and the ratio of silica to alkali metal oxide and the particle size of the resultant sols.

TABLE II

| Sol | Si added (g.) | Ratio | Particle size (mμ) |
|---|---|---|---|
| 1 | ≈200 | 68 | 15.7 |
| 2 | 332 | 130 | 23.5 |
| 5 | 417 | 263 | 41.4 |

The following Table III compares the conversion of silicon to silica with the ratio and particle size in the product.

TABLE III

| Sol | Si added (g.) | Conversion of Si to $SiO_2$, percent | Ratio | Particle size (mμ) |
|---|---|---|---|---|
| 1 | ≈200 | 55 | 68 | 15.7 |
| 12 | 205 | 80 | 158 | 23.7 |
| 11 | 205 | 85 | 170 | 26.1 |
| 10 | 205 | 95 | 177 | 28.4 |

Tables II and III above therefore show that the ratio is directly proportional to the conversion of silicon to silica and the particle size is somewhat influenced by the efficiency of the conversion.

The temperature employed in the sol-forming reaction (including both the temperature during silicon metal addition and during the completion period) is a most important factor in determining the degree of conversion of silicon to silica. Table IV below shows this dependence.

TABLE IV

| Sol | Temperature of reaction mix (° C.) | Si added (g.) | Conversion of Si to $SiO_2$, percent |
|---|---|---|---|
| 1 | 100 | ≈200 | 55 |
| 2 | 100 | 332 | 55 |
| 7 | 88–95→97–99 | | 60 |
| 10 | 90–95 | 205 | 95 |
| 6 | 80 | 174 | 25 |

Table IV therefore shows that the optimum yield of silica is obtained when the temperature of the sol-forming reaction and the heating following addition of silica is controlled within the range of about 85 to 95° C. At both higher and lower temperature, the yield is substantially reduced.

The temperature of the reaction and heating steps is also an important factor in determining the final viscosity of the silica sol.

Table V compares the viscosity of silica sols prepared in accordance with the present invention at concentrations of about 50% silica with Ludox sols, generally prepared by the process set forth in U.S. Pat. 2,574,902. Ludox is a trademark of E. I. du Pont de Nemours & Co.

TABLE V

| Sol | Temperature of reaction mix (° C.) | $SiO_2$ percent | Viscosity (cp.) |
|---|---|---|---|
| 5 | 100 | 50.0 | 45 |
| 9 | 90–97→100 | 50.4 | 147 |
| 7 | 88–95→97–99 | 48.4 | 1025 |
| 10 | 90–95 | 49.7 | 1340 |
| 11 | 90–95 | 51.0 | 750 |
| Ludox TM | | 47.9 | 40 |

The results set forth in Table V show that if the temperature is maintained at 100° C. during the addition of silicon or during the heating step, the viscosity of the sol will be low (below about 200 cp.). On the other hand, if the temperature is controlled within the range of about 85 to 95° C., the viscosity will be quite high compared with other silica sols and specifically be substantially above 300 cp.

The pH values for the sols made from silicon metal are also quite high compared wtih commercial sols and sols made by the usual densification techniques. Commercial sols and those made by the usual densification techniques have pH's in the range of about 8.8 to 9.2 while sols made from silicon metal in accordance with the present invention have pH's in the range of about 9.5 to 10.5.

The relative viscosities set forth in Table I were measured at 10% silica concentration and a pH of 10 with an Ostwald viscometer in a water bath at 25±0.001° C. The results of these measurements are compared in the following Table VI.

TABLE VI

| Sol | Method of preparation | Absolute viscosity (cp.) | Relative visc. at 10% $SiO_2$ |
|---|---|---|---|
| 1 | From Si metal | 17 at 30% $SiO_2$ | 1.09 |
| 9 | do | 147 at 50% $SiO_2$ | 1.20 |
| 11 | do | 750 at 51% $SiO_2$ | 1.23 |
| 10 | do | 1,340 at 50% $SiO_2$ | 1.23 |
| Ludox SM | Densification | | 1.63 |
| Ludox HS | do | | 1.28 |
| Ludox TM | do | 45 at 50% $SiO_2$ | 1.21 |

The above comparison shows that relative viscosity measurements for sols made from silicon metal are surprisingly low even for sols having extremely high absolute viscosities at 50% silica concentration. It would therefore appear that the silica particles of the sols produced in accordance with the present invention have a characteristic which produces a high viscosity at high concentrations but normal viscosities at low concentrations. It is believed that this characteristic is a function of the nature of the particle surface.

The conductivities set forth in Table I were also measured at 10% silica concentrations. These values are approximately the same as those obtained in commercial sols.

The stability of the sols prepared in accordance with the present invention is good. Several of the less viscous sols have been stable for almost two years and the viscous materials have been stable for over fifteen months or more. These sols show no signs of deterioration but will support growth of bacteria. Therefore, most of the sols have been protected against the growth of bacteria by the addition of 200 p.p.m. formaldehyde.

An important property of silica sols is their behavior upon treatment with cation exchange resins. In order to ascertain this behavior of the sols, the sol was passed through a column packed with 100% Amberlite IR 120 in its hydrogen form. Amberlite IR is a trademark of Rohm & Haas Co. The results of treating the sols made from the silicon metal with an ion exchange resin are also summarized in Table I. The sols appear to lose between 70 and 80% of their sodium oxide, yielding ratios of about 240 to 620. Sodium removal at this level is about normal and the ratios indicated are about what would be expected for an ordinary sol. However, some of the sols made from silicon metal did exhibit unusual behavior on contact with the ion exchange resin. Some of the sols increased in viscosity rather substantially thereby making them extremely difficult to remove from the resin. Even though the viscosities became quite high, the sols did not gel and remained stable at an acid pH. The viscosities of sols made by usual densification techniques do not change when contacted with cation exchange resins.

A very significant characteristic of the sols formed in accordance with the present invention is their behavior upon treatment with conventional silica sol gelling agents. Specifically, a 25% silica sol was treated with hydrochloric acid as a gelling agent. The mixtures of acid and sol were prepared carefully by weight, the pH was measured with a pH meter, and the gel times were measured from the instant of preparation. Ludox TM and Nalcoag sols were used as a comparison and formed gels of the conventional type which are hard and occasionally ringing. Nalcoag is a trademark of the Nalco Chemical Co. Periods for forming a gel were extremely long for this material. On the other hand, sols made from silicon metal in accordance with the present invention do not form true gels. Instead, they form what appears to be a coacervate which is thixotropic in some cases. These coacervates neither seemed to harden nor gel nor do they redissolve. Such behavior is evident at both acid and alkaline pH values. Further, the acidified sols become solid upon drying but then break up into powder rather than forming the hard lumps of a true silica gel as made from an alkali metal silicate or from silica sols of commerce.

A surface property test was also conducted in order to determine the nature of the sols made from silicon metal in accordance with the present invention. Potentiometric titrations with dilute acid which theoretically reflect the ion exchange properties of the silica surface showed no essential differences between commercial silica sols and those prepared in accordance with the present invention.

The following Table VII illustrates the preparation of silica sols in accordance with the present invention utilizing alkali metal compounds other than sodium hydroxide and compares these products with a silica sol prepared with ammonia as a catalytic agent at essentially the same conditions which were found optimum for the present invention.

TABLE VII

| | Alkali used | | | | |
|---|---|---|---|---|---|
| | KOH | LiOH | $NH_3$ | 3.22 ratio Na sil. | Na metasilicate |
| Reaction conditions: | | | | | |
| Reaction time (hrs.) | 16 | 18 | 21 | 26 | 34 |
| Reaction temp. (° C.) | 90–95 | 90–95 | 90–95 | 90–95 | 90–95 |
| Si added (g.) (40 or 57 additions) | 224 | 104.2 | 104.2 | 148.9 | 148.9 |
| pH (initial) no Si added | 11.9 | 12.3 | 11.6 | 11.6 | 12.1 |
| Intermediate: | | | | | |
| 20 additions | | 10.6 | 10.8 | 10.6 | 10.6 |
| 25 additions | | 10.4 | | | |
| 30 additions | | | | 10.6 | |
| 35 additions | | 10.0 | | | 10.3 |
| 40 additions | | 10.0 | 10.6 | 10.4 | 10.2 |
| 57 additions | | | | 10.3 | 10.4 |
| Analysis of dilute product: | | | | | |
| Alkali (1 percent $M_2O$) | 0.068 | 0.026 | 1.35 | 0.075 | 0.051 |
| $SiO_2$ (percent) | 9.42 | 3.36 | 2.75 | 7.91 | 5.50 |
| Wt. ratio $SiO_2/M_2O$ | 139 | 129 | 2.04 | 105 | 108 |
| Mole ratio $SiO_2/M_2O$ | 217 | 64 | 1.76 | 109 | 114 |
| pH | 9.5 | 10.0 | 10.8 | 10.3 | |
| Particle size (mμ) | 25.9 | | | | |
| Analysis of concentrated sol: | | | | | |
| Alkali (percent $M_2O$) | 0.23 | | | 0.44 | 0.43 |
| $SiO_2$ (percent) | 40.25 | | | 53.25 | 52.93 |
| Wt. ratio $SiO_2/M_2O$ | 175 | | | 121 | 123 |
| Mole ratio $SiO_2/M_2O$ | 274 | | | 125 | |
| pH | 9.5 | | | 10.6 | 10.3 |
| Particle size (mμ) | 25.6 | | | 22.5 | 22.5 |
| Viscosity, Brookfield (cp.) | 18,400 | | | 88 | 115 |

Also, for comparison with the sols of this invention, Table VIII shows the properties of three Ludox silica sols and Nalcoag 1035 silica sol. The Nalcoag is also produced by the technique set forth in U.S. Pat. 2,574,902. The final three silica sols were prepared in applicant's laboratory in accordance with the procedures utilized in U.S. patent application Ser. No. 501,411, now Patent Number 3,440,175, Apr. 22, 1969, which also form a condensed hydrophobic sol of high concentration from a deionized silicate produced according to Bird Pat. 2,244,325.

TABLE VIII

| | Ludox HS | Ludox TM | Ludox TM | Nalcoag 1035 | D | D | D |
|---|---|---|---|---|---|---|---|
| Percent $Na_2O$ (vol.) | 0.32 | 0.13 | 0.22 | 0.10 | 0.10 | 0.082 | 0.25 |
| Percent $Na_2O$ (spectro) | 0.38 | 0.20 | 0.30 | 0.21 | 0.17 | 0.12 | 0.32 |
| Percent $SiO_2$ (vol.) | 30.0 | 30.0 | 47.93 | 30.0 | 46.70 | 28.26 | 44.20 |
| Wt. ratio: | | | | | | | |
| $SiO_2/Na_2O$ (vol.) | 93 | 226 | 217 | 290 | 467 | 345 | 177 |
| $SiO_2/Na_2O$ (spectro) | 80 | 153 | 159 | 145 | 272 | 236 | 138 |
| Particle size (mμ) [1] | 15.8 | 24.6 | 24.6 | 16 | 29 | 33 | 22 |
| pH | 9.90 | 9.10 | 8.97 | 8.52 | 8.85 | | 9.59 |
| pH at 10% $SiO_2$ | | | | | 9.4 | | |
| Specific gravity | 1.2097 | 1.2042 | | 1.2116 | | | |
| Viscosity: | | | | | | | |
| Brookfield (cp.) [2] | | | 40 | | | | |
| Relative at 10% $SiO_2$ | 1.28 | | | | 1.20 | 1.15 | |

See footnotes at end of table.

TABLE VIII—Continued

| | Ludox HS | Ludox TM | Ludox TM | Nalcoag v035 | D | D | D |
|---|---|---|---|---|---|---|---|
| Conductivity, mhos/cm | $13.69\times10^{-4}$ | | | | $5.76\times10^{-4}$ | | |
| Alkali availability: $Na_2O$ (vol.)/$Na_2O$ (spectro), percent | 84.5 | 65.0 | 73.5 | 47.7 | 59.0 | 68.4 | 78.1 |
| After ion exchange: [3] | | | | | | | |
| Percent $Na_2O$ (spectro) | 0.055 | | 0.055 | 0.047 | | 0.012 | |
| Percent $Na_2O$ removed | 83 | | 82 | 78.5 | | 82.5 | |
| Percent $SiO_2$ | 22.36 | | 47.75 | 32.40 | | 16.79 | |
| Ratio | 406 | | 869 | 690 | | 13.99 | |
| pH | 2.50 | | 1.9 | 1.70 | | | |

[1] Determined by titration.
[2] Determined at 25° C. using the #1 spindle at 100 r.p.m.
[3] Amberlite IR-120 cation-exchange resin used.

The commercial products, those produced by the process of patent application Ser. No. 501,411, now Pat. No. 3,440,175 and the product prepared by utilizing ammonium ion as a catalyst should also be compared with the sols prepared in accordance with the present invention as set forth in Table I. It is to be observed from Table VII that the sol prepared with ammonia had a silica-to-alkali metal oxide ratio substantially below those prepared in accordance with the present invention.

The sol made with lithium hydroxide is rather low in silica and indicated a very limited particle build-up. However, it was still substantially superior to that prepared by use of ammonia. While the ratio of silica-to-metal can be raised in the ammonia-produced sol by boiling off some of the ammonia or by ion exchange, the silica content of this material is so low that the production of concentrated sols therefrom would be extremely difficult. Sols prepared with sodium silicate and sodium metasilicate are of somewhat lower viscosity than those made from sodium hydroxide and require longer reaction periods. The sol prepared with potassium hydroxide resulted in a sol having a high ratio silica-to-metal oxide and a high silica content. The reaction was also quite vigorous. However, the end product was essentially equivalent to sols prepared with sodium hydroxide except that its viscosity at high concentration was substantially higher than that of the sodium hydroxide-prepared materials. Thus, it can be concluded that sols prepared by the use of sodium hydroxide and potassium hydroxide which are more economical than cesium and rubidium sols, are substantially superior to and the reactions proceed with substantially greater ease than those utilizing other alkali metal compounds.

Sols prepared in accordance with the present invention have been found to have numerous possible uses.

For example, it is possible to obtain finely divided silica from these sols. By increasing the silica content during processing, silica will start to separate above about 11 or 12% silica and may be removed by conventional means. Also, a concentrated sol may be dried and fine silica may be obtained. If, in addition, phosphate ions or organic phosphate esters are added to the solution, the silica will remain well dispersed.

Other applications include the use of such sols to treat Fiberglas to thereby impart slip resistance to the same. This treatment affects the strength of the Fiberglas. It has been found that sols prepared in accordance with the present invention perform satisfactorily in this application. This is illustrated by the following example.

The strength of chrome treated (a methacrylic chromic chloride complex applied to heat cleaned fabric from aqueous solution) Fiberglas fibers were tested after treatment with various sols. The results are tabulated in the following table:

| Sol | Percent $SiO_2$ | pH | Scott Tensile Tester readings: Room temp. cure | Scott Tensile Tester readings: 300° C. cure |
|---|---|---|---|---|
| None | | | 172 | 148 |
| Ludox HS | 10 | | 148 | 112 |
| Syton DS-240 | 10 | | 182 | 124 |
| Present invention | 10 | 10.3 | 167 | 119 |
| Do | 10 | 9.8 | 172 | 156 |
| Do | 10 | 9.8 | 120 | 100 |

Syton is a trademark of Monsanto Chemical Co. Sols prepared in accordance with the present invention are also useful as binders for acid resistant Synar cement and as binders for refractory materials in shell molding. Synar is a trademark of Pennsalt Chemical Co. In these particular uses, it appears that the sols prepared in accordance with the present invention are more effective binders than commercial sols such as Ludox.

The sols of the present invention may also be utilized in the preparation of methyltriethanol ammonium silicate. It has been found that sols in accordance with the present invention react with ethylene oxide and methylamine in substantially the same manner as do commercial sols. In addition, the silicate product also appears to be essentially equivalent for most uses.

What is claimed is:

1. A method of preparing a silica sol, comprising: forming an aqueous solution of an inorganic alkali metal compound having a pH above about 11; and contacting said aqueous solution with silicon metal at a temperature above ambient temperature and sufficient to cause the reaction of said silicon with said water to form a silica sol having a mole ratio of $SiO_2/M_2O$ of at least 25, where M represents an alkali metal.

2. A method in accordance with claim 1 wherein the alkali metal compound is a material selected from the group consisting of sodium hydroxide, potassium hydroxide, and a soluble alkali metal silicate.

3. A method in accordance with claim 1 wherein the siilcon metal is contacted with the aqueous solution by adding incremental amounts of said silicon metal in sequential steps.

4. A method in accordance with claim 3 wherein sufficient time is allowed between each step of silicon metal addition to permit substantially complete reaction of the previously added silicon metal.

5. A method in accordance with claim 1 wherein the silicon metal is contacted with the aqueous solution by continuously adding the silicon metal to said solution.

6. A method in accordance with claim 1 wherein the concentration of silica in the reaction mixture is maintained below about 12% by adding water to the reaction mixture along with the silicon metal.

7. A method in accordance with claim 1 wherein the temperature is maintained between about 50 and 100° C.

8. A method in accordance with claim 7 wherein the temperature is maintained between about 90 and 95° C.

9. A method in accordance with claim 7 wherein the temperature is raised to 100° C. following completion of the addition of silicon metal.

10. A method in accordance with claim 1 wherein the elevated temperature is maintained for a predetermined period, following the completion of the addition of the silicon metal, at least sufficient to increase the conversion of silicon to silica.

11. A silica sol having a mole ratio of $SiO_2/M_2O$ of at least 25, where M represents an alkali metal, formed by reacting metallic silicon with water in the presence of an aqueous solution having a pH above about 11 containing a catalytic amount of an alkali metal inorganic compound.

12. A sol in accordance with claim 11 wherein the alkali metal compound is a compound selected from the group consisting of sodium hydroxide, potassium hydroxide, and a soluble alkali metal silicate.

13. A sol in accordance with claim 11 wherein the reaction is carried out at a temperature between about 90 and 95° C.

14. A sol in accordance with claim 11 wherein the reaction is carried out at a temperature which reaches 100° C. following completion of the addition of silicon metal.

15. A sol in accordance with claim 11 wherein the sol is concentrated to a silica content between about 10 and 52%.

16. A finely divided silica separated from the sol of claim 11 by concentrating the same to a silica content above about 52%.

References Cited

UNITED STATES PATENTS

| | | | |
|---|---|---|---|
| 2,614,993 | 10/1952 | Montenyohl et al. | 252—313 |
| 2,900,348 | 8/1959 | Ahlberg et al. | 252—313 |
| 3,069,277 | 12/1962 | Teja | 252—313 X |
| 3,128,251 | 4/1964 | Reven et al. | 252—313 |

RICHARD D. LOVERING, Primary Examiner

U.S. Cl. X.R.

23—182 R; 106—36, 38.3; 117—126 GF; 252—317